May 3, 1966

D. R. BRIGGS ET AL 3,249,683

TRANSISTOR STEP-HEADER

Filed Dec. 19, 1963

Doyce R. Briggs
Edward P. Tober
INVENTORS

BY John G. Graham
ATTORNEY

United States Patent Office 3,249,683

Patented May 3, 1966

3,249,683

TRANSISTOR STEP-HEADER

Doyce R. Briggs and Edward P. Tober, Richardson, Tex., assignors to Texas Instruments Incorporated, Dallas, Tex., a corporation of Delaware Filed Dec. 19, 1963, Ser. No. 331,717
4 Claims. (Cl. 174—50.56)

This invention relates to semiconductor devices and, more particularly, to pressure-bonded enclosures therefor.

In the semiconductor art it is common practice to provide various safeguards against possible contamination of the active elements of the semiconductor device. To provide for this protection, the device itself is usually encapsulated in an air-tight, hermetically sealed enclosure, the most commonly used form of which consists of a base section, usually referred to as the header, and a cover therefor, usually referred to as the can. The semiconductor device is mounted upon the header within the enclosing can, and the header and can are then sealed together. Contact to the active elements of the device is made through the header by extending leads through openings therein and through a layer of glass insulating and sealing the leads from the header. The device may be mounted on the header either in direct electrical contact therewith or insulated therefrom. The active elements of the device are connected to and may be supported by the leads. Enclosures of this type are generally standard for transistor packages and are widely used throughout the industry.

Containers of this type provide benefits of standardization; however, they also create some problems in the production of transistors. Welding or soldering the can to the header, for instance, may produce gaseous metallic particles detrimental to the active elements, while weld flashes and out-gassing of gases from the heated metal may contaminate the inside of the enclosure and thus degrade the semiconductor device. One method of avoiding the problems of out-gassing and contamination is by cold-welding, a form of pressure bonding that seals the header and can without the aid of heat. The use of cold welding itself, on the other hand, presents various problems. One in particular, and the most important, is that when two metallic objects are cold welded, they are pressed together with great pressure in a defined area, causing metal to flow outward from the area to which the pressure is applied. This flow of metal, if not carefully controlled, may crack the insulating media within the header and destroy and break the hermetic seal between the leads and the header.

It is therefore an object of the invention to provide a hermetically sealed enclosure.

Another object is to provide a pressure weldable enclosure.

Still another object is to provide an enclosure free of the contamination usually produced during sealing.

Figure 1:
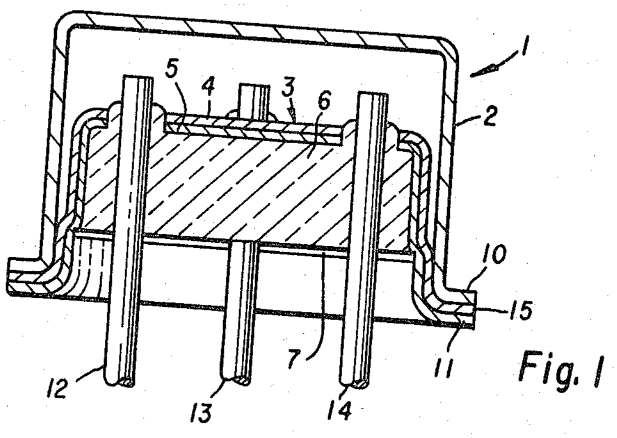
Figure 2A:
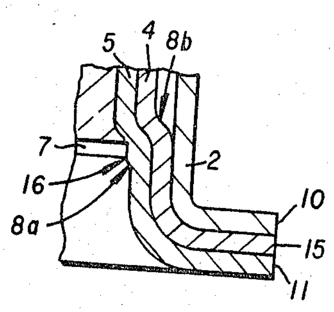
Figure 2B:
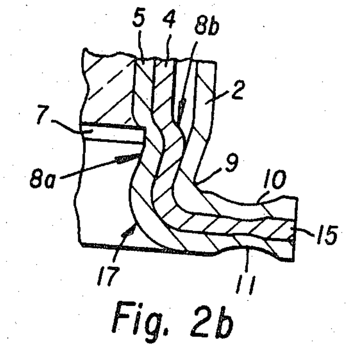
Figure 3:
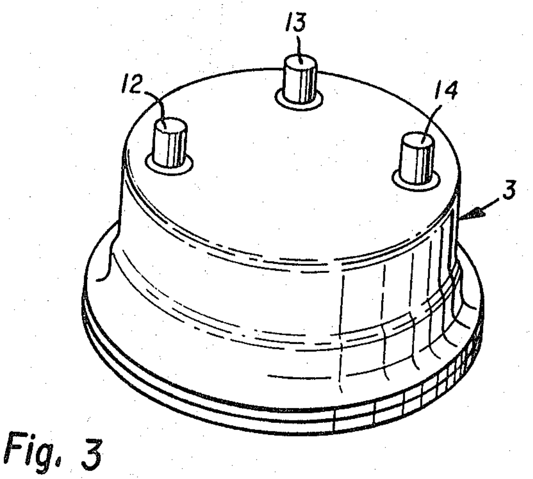

Other objects, features and advantages of the present invention will become more readily apparent when read in conjunction with the following detailed description, appended claims and the attached drawing in which:

FIGURE 1 is a cross-sectional view of a header with a can in place before welding;

FIGURE 2*a* shows a portion of the flange area of the header and can before welding;

FIGURE 2*b* shows the same portion as FIGURE 2*a* after welding;

FIGURE 3 shows a pictorial top view of the header.

Referring now to FIGURE 1, there is shown a semiconductor enclosure 1, the two principal parts being the header 3 and the can 2. The header is a shell made out of clad metals and is partially filled with an insulating material 6, preferably glass. The leads 12, 13 and 14 pass through openings in the header top surface, but are held away therefrom in a fixed position by the insulating material 6. The header has two layers, an outer layer 4 and an inner layer 5, layer 5 being a metal having a coefficient of expansion which is near that of the insulating material 6. A commonly used metal for layer 5 is a cobalt-iron-nickel alloy commonly referred to by its trade name, as Kovar. The outer layer 4 may be any suitable pressure weldable material such as copper. Although other metals may be used for the outer layer 4, it is desirable to use a metal having good heat conductive properties which will dissipate heat rapidly away from the semiconductor device.

Below the glass 6 is groove 7 which extends around the inner circumference of the header just below the glass. The purpose of this groove is to prevent the glass 6 or other insulating material from extending below the groove.

FIGURE 2*a* is a portion of the header-can assembly shown in FIGURE 1. The relative position of the flange of the header and the flange of the can are shown. It should be noted that the vertical wall of the header has an offset, or step, **8*a*–8*b* located just above the flange. The flange portions 11 and 15 make up the clad layers of the header, while 10 is the flange portion of the can 2. The vertical wall offsets outward at 8*a*–8*b*, 8*a* being the Kovar layer and 8*b* being the copper layer. This offset coincides with the groove 7 which is located on the inside wall of the header and is formed into a portion of the layer 5. As mentioned above, groove 7 prevents the flow of insulating material 6 from extending below the point 16, thereby avoiding damage to the insulating material 6** during the sealing.

Can 2 rests with its flange 10 upon flange 15 of the header, and in close contact therewith. In FIGURE 2*b* is shown the same portion of the header can assembly after the two have been cold welded together. Due to the pressure exerted by the welding dies (not shown) indentations occur in flange 10 of the can and layer 11 of the header. Pressure causes metal to flow, forcing the can in at 9 and bending the header flange inwardly as indicated at 17. The vertical wall of the header bends in at the step, pivoting at the corner indicated at 16. The bending-in of the vertical wall at the step and about the groove at 16 prevents pressure from being exerted on the insulating material and thereby prevents cracking or breaking of the insulating material. Since the flanges are cold welded and no heat is supplied, there will be no weld flash or outgassing of the metals to contaminate the semiconductor device enclosed therein.

FIGURE 3 shows a top view of the header showing the locations of the leads and the general appearance of the header. A semiconductor device may be mounted on the top surface of the header between the three leads with wires attaching the leads to the active area of the device.

Although the present invention has been shown and illustrated in terms of a specific embodiment, it will be apparent that changes and modifications are possible without departing from the spirit and scope of the invention as defined in the appended claims.

What is claimed is:

1. A semiconductor encapsulating device comprising: a metallic shell having a plurality of layers clad together encasing a body of insulating material; and a plurality of leads passing through said body and electrically isolated from said shell, said metallic shell having a top portion and a vertical wall portion with a stepped region extending completely around said wall and terminating in a flanged peripheral region.

2. A semiconductor encapsulating device comprising: a metallic shell having a plurality of layers clad together and a flat circular top surface, a vertical wall portion having a stepped region extending around said wall and terminating in a peripheral flange region around said shell; a body of insulating material encased in said metallic shell, and a plurality of leads passing through said insulating body and said shell and electrically insulated from said shell.

3. A stepped wall semiconductor header made of a plurality of metallic layers clad together, said header enclosing an insulating material with a plurality of leads passing therethrough and electrically insulated from said header and said header having an interior groove extending around said stepped wall below said insulating material, said insulating material being completely contained above said groove.

4. A stepped wall semiconductor header made of a plurality of metallic layers clad together, said header enclosing an insulating material with a plurality of leads passing therethrough and electrically insulated from said header and said header having an interior groove extending around said stepped wall below said insulating material, said groove being effective in preventing glass from flowing below said step thereby preventing damage to said insulating material.

References Cited by the Examiner

UNITED STATES PATENTS

| | | | |
|---|---|---|---|
| 2,107,428 | 2/1938 | Sexton | 29—520 |
| 2,934,588 | 4/1960 | Ronci | 174—50.5 |
| 3,136,050 | 6/1964 | Trueb et al. | 174—50.5 X |
| 3,136,932 | 6/1964 | Trent | 317—234 |
| 3,140,530 | 7/1964 | Certa | 29—492 X |

FOREIGN PATENTS

| | | |
|---|---|---|
| 211,998 | 2/1956 | Australia. |

OTHER REFERENCES

"IRE Transactions on Electron Devices," vol. ED-6, No. 3, July 1959, p. 312 relied on.

ROBERT K. SCHAEFER, *Primary Examiner.*

JOHN F. BURNS, *Examiner.*

W. B. FREDRICKS, J. F. RUGGIERO, *Assistant Examiners.*